US008364654B2

(12) United States Patent  
Engel

(10) Patent No.: US 8,364,654 B2  
(45) Date of Patent: Jan. 29, 2013

(54) METHOD AND SYSTEM FOR AUTOMATING RECORD STORAGE ON A RECORD MANAGEMENT SERVER

(75) Inventor: Andreas Engel, Weinheim (DE)

(73) Assignee: SAP AG, Walldorf (DE)

( * ) Notice: Subject to any disclaimer, the term of this patent is extended or adjusted under 35 U.S.C. 154(b) by 657 days.

(21) Appl. No.: 11/514,475

(22) Filed: Aug. 31, 2006

(65) Prior Publication Data

US 2007/0067312 A1 Mar. 22, 2007

(30) Foreign Application Priority Data

Sep. 16, 2005 (EP) .................................. 05077119

(51) Int. Cl.  
*G06F 7/00* (2006.01)  
*G06F 17/00* (2006.01)

(52) U.S. Cl. ......................................................... 707/694

(58) Field of Classification Search .................... 707/10, 707/999.01, 694  
See application file for complete search history.

(56) References Cited

U.S. PATENT DOCUMENTS

| 6,216,122 | B1 * | 4/2001 | Elson ................................... 1/1 |
| 2002/0065897 | A1 * | 5/2002 | Voticky et al. ................. 709/207 |
| 2003/0140121 | A1 * | 7/2003 | Adams ........................... 709/219 |
| 2003/0177132 | A1 * | 9/2003 | Thomas et al. ............... 707/100 |
| 2004/0267557 | A1 * | 12/2004 | Liu et al. ............................ 705/1 |
| 2008/0005249 | A1 * | 1/2008 | Hart ............................ 709/206 |

* cited by examiner

*Primary Examiner* — Alexy Shmatov  
(74) *Attorney, Agent, or Firm* — Kenyon & Kenyon LLP

(57) ABSTRACT

A procedure and system is provided for automating storage of records on a records management server. The procedure includes storing the record on a records management server responsive to identifying an identifier in the record. The procedure also includes associating the record with a file on the server, wherein the file corresponds to the identifier.

35 Claims, 4 Drawing Sheets

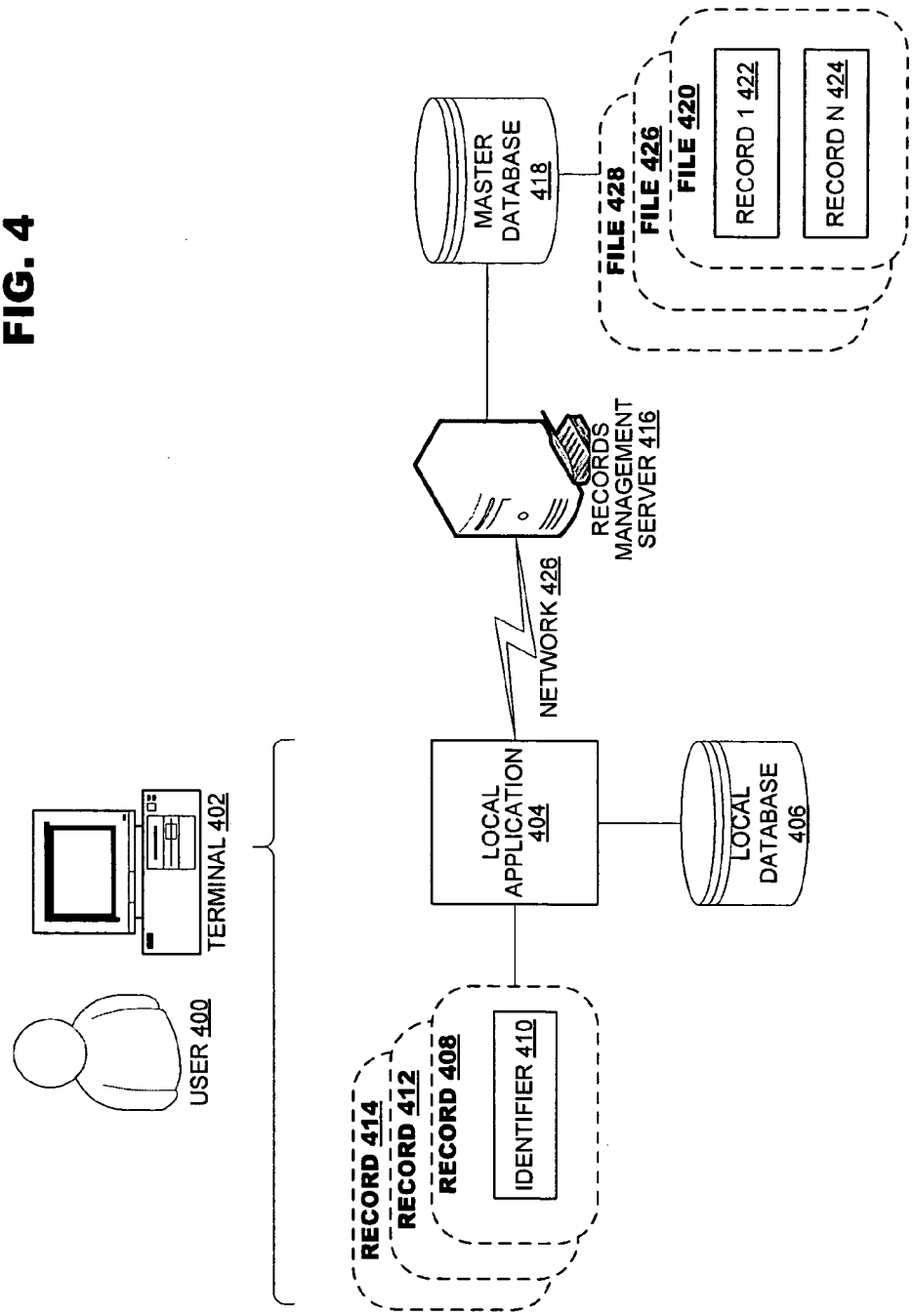

METHOD AND SYSTEM FOR AUTOMATING RECORD STORAGE ON A RECORD MANAGEMENT SERVER

BACKGROUND

In the course of conducting business, enterprises may create and save large amounts of records. A record may be information created, received, and maintained as evidence and information pursuant to legal obligations or in the transaction of business. For example, a record may be a document, a form or template, an email, a telephone log entry, an audio recording, a business partner's contact information, or any other information. Legal obligations to maintain records may arise from governmental regulations, especially in certain industries such as insurance or finance.

The storage of a large amount of records creates the need for record management. Records management is the practice of identifying, classifying, archiving, preserving, and destroying records saved by the enterprise. An enterprise may use a records management system including a records management server, a network, and at least one terminal to manage its electronic records. The records management system may be required to comply with industry standards or governmental regulations.

SUMMARY

In exemplary embodiments, a method can include receiving a plurality of records electronically at a first terminal local to a user. The records can include, e.g., an e-mail, a word processing letter document, and an audio phone recording. The method can further include automatically storing the received records on a remote server in response to detecting an identifier in the records at the first terminal. The identifier can identify a contact in a contact application executed on the first terminal, and can, e.g., include a sender for the e-mail, an originating telephone number for the audio phone recording, and a letter recipient for the word processing letter document. The method can further include associating the stored records on the server with the contact, displaying by the contact application a list of records stored on the server corresponding to the contact, and providing by the contact application access to the stored records. Other embodiments exist, however, having a greater or lesser number of or different features.

BRIEF DESCRIPTION OF THE DRAWINGS

FIG. 4 illustrates an example system for automating record storage, in accordance with one embodiment of the present invention.

DETAILED DESCRIPTION

Figure 1:
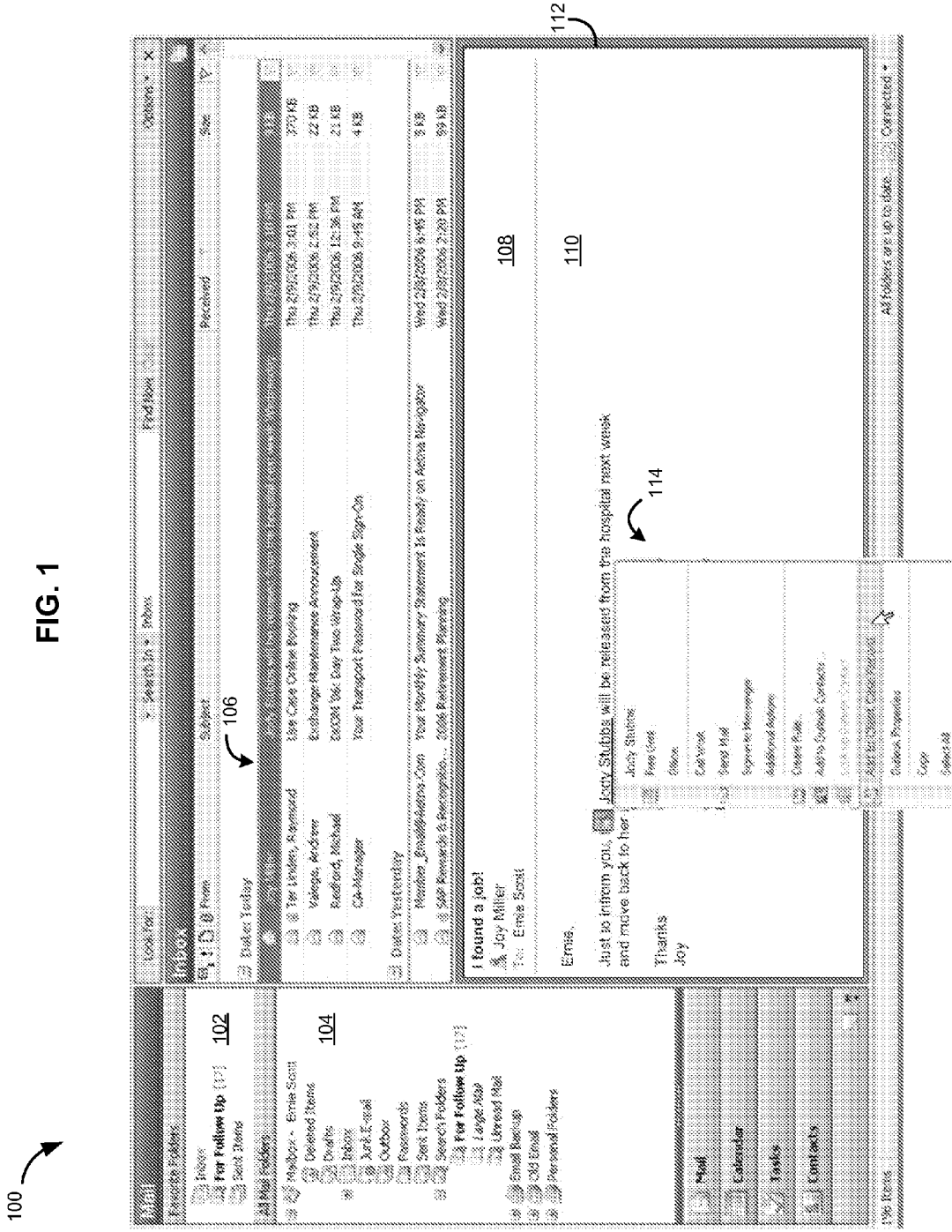
FIG. 1 illustrates an example screen shot of an email client, in accordance with one embodiment of the present invention.

A system and method are provided for automatically storing a record on a records management server when the record is created or received. For example, an incoming email received at a terminal identified as from a recognized business partner may be automatically stored on the server and associated with an appropriate file in a master database. Each file may be a collection of records associated with a business partner. A business partner may be a party for whom records are kept.

The method is more convenient than requiring the user to manually save the email to a local file destination, logging into the server, identifying the appropriate file to associate the email with, and storing the record on the server. Similarly, a newly created document may be automatically stored on the server and associated with an appropriate file in the master database.

An example embodiment of the present invention may be a procedure for storing a record. The procedure may include storing the record on a records management server responsive to identifying an identifier in the record. The procedure may include associating the record with a file on the server, wherein the file corresponds to the identifier. The storing and the identifying may be executed automatically. The identifying may be achieved via smart text. The identifier may be a business partner's name. The record may be an incoming email received at a user's terminal. The record may be a newly created document. The procedure may also include creating the file on the server if the file corresponding to the identifier does not exist. The procedure may also include responsive to a request for metadata, receiving metadata corresponding to the record. The procedure may also include storing the metadata on the server and associating the metadata with the record.

Another example embodiment of the present invention may be a system for storing a record. The system may include a record, including an identifier. The system may include a records management server, including a master database, and a plurality of files stored in the master database. The system may include a local application, the local application in communication with the server, the local application configured to store the record in the master database responsive to identifying the identifier of the record, and associating the record with a file in the master database, wherein the file corresponds to the identifier. The system may include a local database in communication with the local application, wherein the local application is further configured to store the record in the local database. The system may include a terminal, wherein the local application executes on the terminal. The storing and the identifying may be executed automatically. The identifying may be achieved via smart text. The local application may be further configured to create the file on the server if the file corresponding to the identifier does not exist.

Another example embodiment of the present invention may be a computer-readable medium including instructions adapted to execute a procedure for storing a record, the procedure including storing the record on a records management server responsive to identifying an identifier in the record, and associating the record with a file on the server, wherein the file corresponds to the identifier. The storing and the identifying may be executed automatically. The identifying may be achieved via smart text. The record may be a newly created document. The procedure may include creating the file on the server if the file corresponding to the identifier does not exist. The procedure may include responsive to a request for metadata, receiving metadata corresponding to the record, and storing the metadata on the server and associating the metadata with the file.

FIG. 1 illustrates an example screen shot of an email client, in accordance with one embodiment of the present invention. For example, the procedure depicted in FIG. 3 may be implemented with an email client, where a user receives incoming emails and sends outgoing emails to business partners. Each business partner may be a respondent whom the user is responsible for communicating with.

Figure 3:
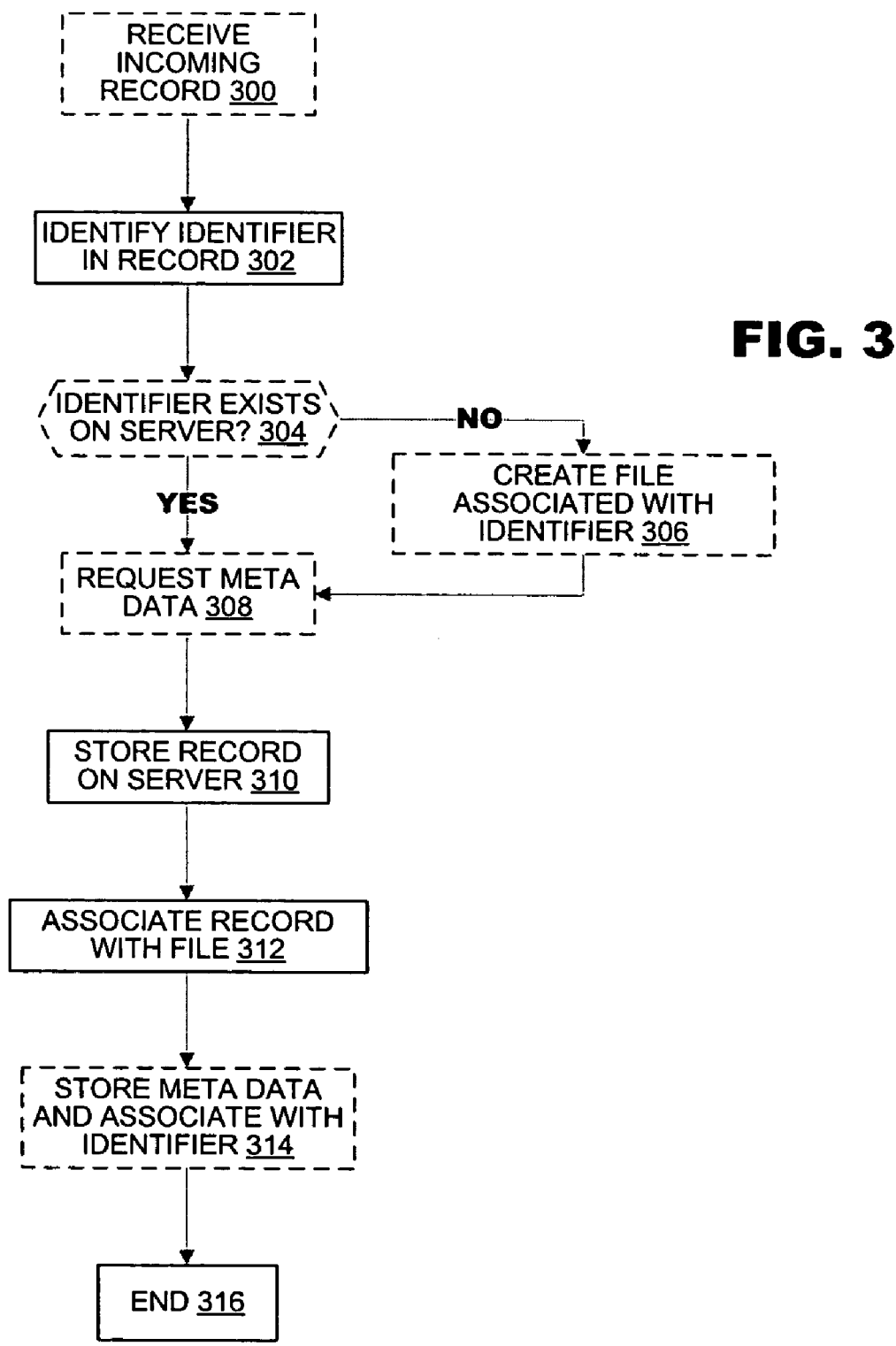
FIG. 3 illustrates an example procedure for automating record storage, in accordance with one embodiment of the present invention.

The email client 100 may be a standard email client with additional functionality provided via a software plug-in or other extension. The additional functionality may include automatic and integrated storage of received emails on a records management server. An incoming email may be automatically processed and an identifier included in the email identified. For example, the identifier may be a sender's email address or full name. The email client may then automatically store the incoming email on the server as a record and associate the stored email with other records corresponding to the identifier. For example, the identifier may be identified with "smart text" technology available in certain operating systems which automatically recognizes names within text displayed on a terminal. The procedure to offer the functionality may be as depicted in FIG. 3.

The functionality may be offered with a variety of other applications as described below, either by adding a plug-in to the application or by other extensions.

The email client 100 may provide a pop-up menu 114. For example, the pop-up menu 114 may be displayed when the user right clicks the mouse in the preview pane. The menu may provide a plurality of options and tools to the user, including manually storing the email in the records management server. It will be appreciated that this option may be in addition to the automatic record storing feature described above.

The email client 100 may include a favorite folders display 102. The favorite folders display 102 may display a list of user-defined or programmer-defined folders in an easy to access list for quick user access. Each folder may store emails received by the user.

The email client 100 may include a list of mail folders 104. The mail folders 104 may display a list of folders available to the user. The user may select an active folder from among the folders available.

The email client 100 may include an index of available emails 106. The available emails 106 may display emails of the currently active folder. From there, the emails may be viewed in the preview pane 112 or moved to another folder in the favorite folders display 102 or the mail folders 104.

The email client 100 may include a preview pane 112 that includes a header section 108 and a body section 110. Each email may include a header and a body, which are displayed in the corresponding header section 108 and the body section 110.

It will be appreciated that the email client may be replaced with any other application that requires automatic and integrated access to a records management server. For example, a word processor may include the functionality and automatically store documents such as form letters on the server.

Figure 2:
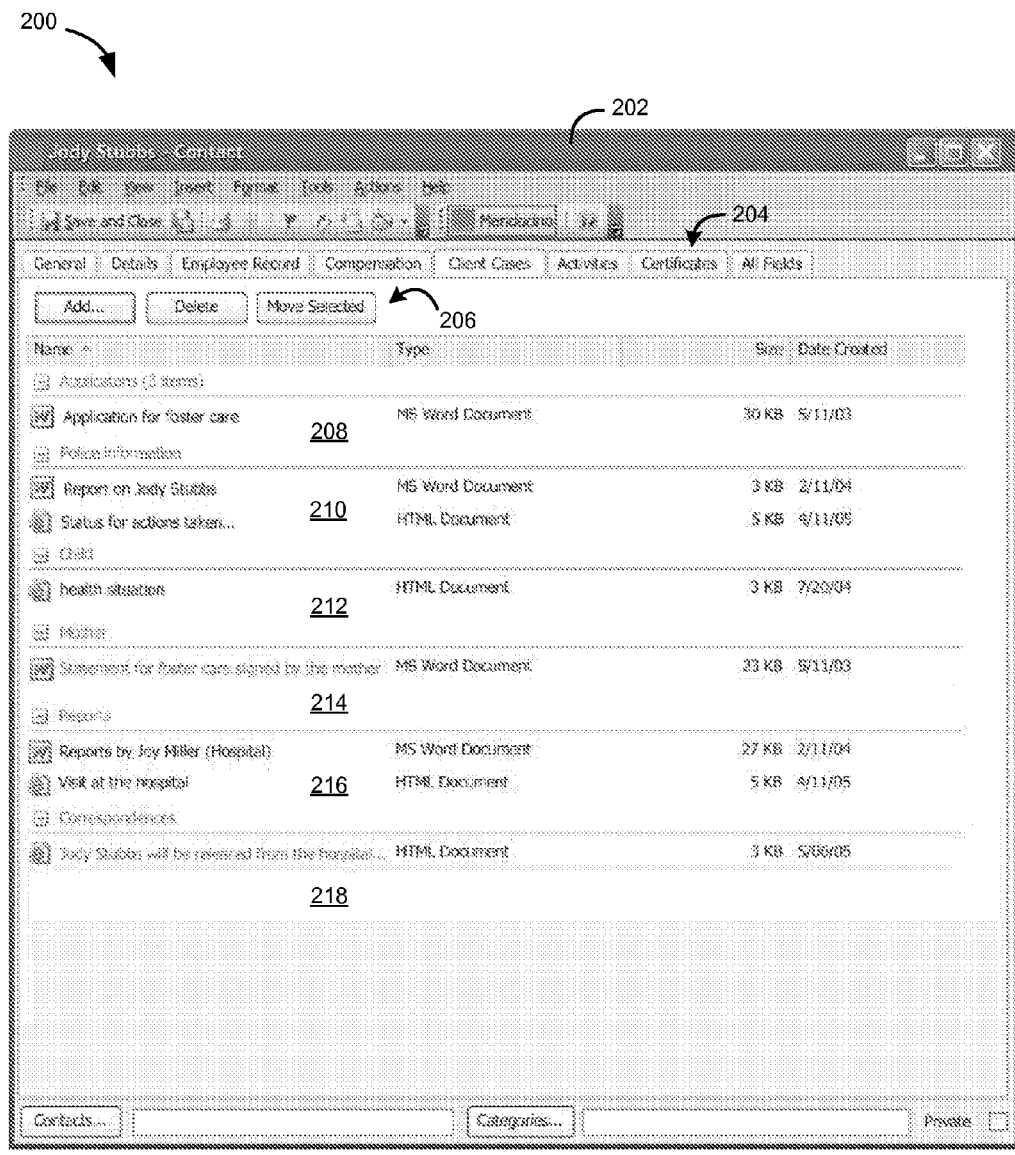
FIG. 2 illustrates an example screen shot of a contact display, in accordance with one embodiment of the present invention.

FIG. 2 illustrates an example screen shot of a contact display, in accordance with one embodiment of the present invention. A terminal may provide contact display 200. The contact display 200 may provide access to all records related to the contact, such as contact information, previously sent emails, and other information.

The records may be stored on a records management server and relate to transactions undertaken by an enterprise during its course of business. The records may be organized into files, each file associated with an identifier. Thus, all records associated with a particular business partner may be organized into a single file. For example, the identifier may be a business partner's name, email address, or unique identifying number. The records may include emails received and stored through the email client depicted in FIG. 1. A user may thus use the contact display 200 to view previously stored records related to an identifier.

The contact display 200 may display records related to a selected business partner or contact. The records may be retrieved from the records management server and may also be cached at the terminal. Adding or changing records will be reflected in changes to the records stored on the records management server.

The contact display 200 may include a title bar 202. The title bar 202 may display the name of the contact and the name of the window.

The contact display 200 may include tabs 204. The tabs 204 may allow the user to switch between different views, each view providing a different collection of records. For example, views may include: general information about the business partner, detailed information about the business partner, and current related records such as documents and emails.

The contact display 200 may include action buttons 206. The action buttons 206 may provide the user with actions to be conducted on the records displayed. For example, records may be added, deleted, or moved.

The contact display 200 may include records 208, 210, 212, 214, 216, and 218. A record may be an electronic document, an email, or any other information stored on the records management server as a record.

It will be appreciated that the contact display 200 may be modified or configured to display any other collection of records available from the records management server. The records may be displayed at the terminal in various ways depending on how the records are organized or should be presented.

FIG. 3 illustrates an example procedure for automating record storage, in accordance with one embodiment of the present invention. The procedure may execute on a terminal in communication with a records management server over a network. The records management server may store all records or a subset of records within an enterprise system. For example, the procedure may execute on a system depicted in FIG. 4.

The procedure may provide functionality to automatically storing a record on the records management server. For example, the functionality may be added to an email client as depicted in FIG. 1. By automatically storing records on the records management server, the functionality simplifies a user's workflow process by eliminating or reducing the need to manually store records. Records may need to be stored due to various business needs.

In 300, the procedure may optionally receive an incoming record. For example, an incoming record may be an incoming email, as depicted in FIG. 1. The incoming email may be received by an email client and automatically processed, as described below.

In an alternative embodiment, the record may be any other type of record. For example, the record may be a new document created from a form letter template in a word processing application. Other records may be an audio recording of a phone conversation or a received document scanned into the system.

In 302, the procedure may identify an identifier within the record. For example, the identifier may be a sender of an incoming email. Alternatively, the identifier may be a recipient of a form letter created from a template in a word processing application. Alternatively, the identifier may be an originating telephone number of a telephone call. Alternatively, the identifier may be a machine-readable identifier on a scanned document.

In 304, the procedure may optionally test whether the identifier already exists on the records management server. As depicted in FIG. 4, the records management server may include a master database which stores records. The records may be organized into files, each file associated with an identifier. In one embodiment, the procedure may check in the master database for a file with the same identifier. If the identifier is found, a file already exists that the record should be associated with.

For example, if the identifier is a business partner with whom email communications are held, the records may include past emails and documents sent to and received from the business partner. The records may also include other information about the business partner, such as contact information, medical history, or any other information previously stored on the records management system.

If no, the procedure may proceed to 306. If yes, the procedure may proceed to 308.

In 306, the procedure may optionally create a file associated with the identifier. If the identifier is not found in the records management server, the record received in 300 may be for a new business partner. Thus, a new file may be created in the master database.

In 308, the procedure may optionally request metadata from the user to be stored with the record. For example, additional metadata may be a category, a priority code, key words, or any other metadata that can be stored in the master database and associated with the record. The metadata may improve future searches within the master database, or provide improved customer service to the business partner.

In 310, the procedure may store the record on the server. For example, the record may be stored and indexed on the records management server in the master database.

In 312, the procedure may associate the record with the file on the server. For example, the record may be stored with an identifier identifying the file with which it is associated.

In 314, the procedure may store metadata obtained in 308 on the server and associate the metadata with the file. For example, the metadata may be stored with an identifier identifying the file with which it is associated and the record with which it is associated.

In 316, the procedure may end.

FIG. 4 illustrates an example system for automating record storage, in accordance with one embodiment of the present invention. The system may be part of an enterprise network system that includes at least one terminal, a network, and a records management server. The enterprise network may be used by an enterprise in its day-to-day business, both conducting transactions relevant to its business and storing transaction as required.

A user 400 may interact with a terminal 402. A terminal 402 may be any device that is able to communicate with a records management server 416 over a network 426. For example, the terminal 402 may be a personal computer running a standard operating system such as Microsoft Windows or UNIX. The terminal 402 may include input devices such as a keyboard, a pointer device, and a microphone. The terminal 402 may include output devices such as a display screen, audio speakers, and a printer. The terminal 402 may include a network interface for communicating over the network 426.

While only one terminal is depicted in FIG. 4, it is understood that the system may include any number of terminals.

The terminal 402 may be configured to execute a local application 404. It will be appreciated that the local application 404 may be any application that may be executed on the terminal 402 and requires access to records from the records management server 416. For example, the local application 404 may be an email application as depicted in FIG. 3 that automatically stores incoming emails as records. In an alternative embodiment, the local application 404 may be a records management application that allows the user 400 to maintain a set of records. In an alternative embodiment, the local application 404 may be a word processing application that automatically stores newly created documents, perhaps from previously-saved templates, on the records management server 416.

The terminal 402 may include a local database 406. The local database 406 may be stored on a storage medium accessible to the terminal 402 such as a hard drive, a flash drive, or other writeable medium. The local database 406 may be configured to store records in a relational database, a flat file, or another format.

The terminal 402 may include record 408. The record 408 may be a record created on the terminal 402 by the local application 404, or a copy of a record stored on the records management server 416.

The record 408 may include an identifier 410. For example, the identifier 410 may be associated with the record 408 and may be, for example, an incoming e-mail's sender or a recipient of a form letter created by a word process application. The identifier 410 may be unique within the local database 406 or in the records management server 416. In one embodiment, the record 408 may be an incoming email and the identifier may be the sender of the email, a business partner whom the user 400 is responsible for.

The terminal 402 may include any number of records. FIG. 4 depicts terminal 402 with additional records 412 and 414. For example, the records on the terminal 402 may be stored in the local database 406.

In an alternative embodiment, the terminal 402 may be a thin client and the local application 404 may execute on a remote applications server (not depicted), with inputs and outputs transmitted over the network 426. In an alternative embodiment, the local database 406 and the records 408, 412, and 414 may be stored at a computer remote from the terminal. In such an embodiment, the terminal 402 would communicate with the computer over a communications network, either network 426 or a separate network.

The network 426 may carry communications between the terminal 402 and the records management server 416. For example, the network 426 may be a standard or non-standard communication network such as the Internet, an intranet, a virtual private network, an Ethernet or other local network.

The records management server 416 may be a centrally located server which manages the records stored on behalf of the enterprise in the system. The server 416 may include hardware configured to execute a master database 418 including processors, hard drives, memory, and any other required components.

The server 416 may include a master database 418. The master database 418 may be configured to store all the records in the system, or just a specific subset. For example, a system may include multiple master databases, each database storing a subset of records.

The master database 418 may be a relational database optimized for fast storage and searches. The master database 418 may include a plurality of files 420, 426 and 428. It is appreciated that any number of files may be stored on the master database 418.

Each file may be a collection of one or more records associated together. There may be any number of records from record 1 422 to record N 424 included in a file. For example, a file may be all records associated with a particular business partner, and the records may include the business partner's contact information, past emails sent to and received from the business partner, documents or other attachments sent to and received from the business partner.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A method, comprising:
   receiving a plurality of first records electronically over a data communication line at a first terminal, wherein the first terminal includes a processor and memory and is local to a human user, and the first records include at least one of: an e-mail, a word processing letter document, or an audio phone recording;
   automatically storing the received first records on a records management server, remote from the first terminal, responsive to automatically identifying an identifier in the first records at the first terminal, wherein the identifier identifies a contact of a plurality of contacts in a contact application executed on the first terminal, the identifier including a sender for the e-mail, an originating telephone number for the audio phone recording, and a letter recipient for the word processing letter document, wherein the automatically identifying the identifier in the e-mail includes using smart text to automatically recognize names within text at the first terminal;
   automatically storing on the remote server a second record newly created at the first terminal, responsive to automatically identifying the identifier in the second record at the first terminal;
   associating the stored first and second records with a file on the server corresponding to the contact;
   displaying, by the contact application, a representation of all records stored on the server corresponding to the contact; and
   providing, by the contact application, access to all records stored on the server corresponding to the contact.

2. The method of claim 1, wherein the identifier identifies a business partner's name.

3. The method of claim 1, further comprising:
   creating the file on the server if the file corresponding to the contact does not exist.

4. The method of claim 1, further comprising:
   requesting metadata related to the first records from a user of the first terminal;
   receiving the metadata related to the first records from the user;
   storing the metadata on the remote server; and
   associating the metadata with the file on the remote server.

5. The method of claim 1, wherein the first records are received electronically from an originating computer that is different than the first terminal and the records management server.

6. The method of claim 1, wherein the first records are received intact, and not entered manually by a user of the first terminal.

7. The method of claim 1, wherein the first records do not already exist at the first terminal prior to being received electronically at the first terminal.

8. The method of claim 1, wherein the identifier of the e-mail is based on at least one of: an email address of the sender of the email, or a name of the sender of the email; and
   wherein the automatically identifying the identifier of the e-mail includes scanning the email to identify at least one of: the email address of the sender, or the name of the sender.

9. The method of claim 1, wherein the first records include a scanned document, and the identifier includes a machine readable identifier for the scanned document.

10. The method of claim 1, further comprising:
    displaying, by the contact application, a plurality of user-selectable tabs including a first tab and a second tab;
    in response to selection by the user of the first tab, displaying information related to the contact; and
    in response to selection by the user of the second tab, displaying the representation of all records stored on the server corresponding to the contact.

11. The method of claim 1, further comprising:
    displaying, by the contact application, a plurality of action buttons configured to implement, in response to selection by the user, a plurality of actions on stored records corresponding to the contact, the actions including adding, deleting and moving the records.

12. The method of claim 1, further comprising testing whether the identifier already exists on the records management server.

13. The method of claim 12, wherein the testing includes checking whether the file exists on the records management server and includes the identifier.

14. The method of claim 12, further comprising, in response to a determination that the identifier does not already exist on the records management server, creating the file on the records management server and associating the file with the identifier.

15. The method of claim 1, wherein the automatically storing in response to the automatic identifying is performed by a plurality of different applications, including an email application and a word processing application.

16. The method of claim 15, wherein the automatically storing in response to the automatic identifying is performed by plug-ins to the plurality of different applications.

17. The method of claim 1, further comprising providing a menu to a user for manually storing the received first records on the records management server in addition to the automatic storing in response to the automatic identifying.

18. A non-transitory computer-readable storage medium including instructions, which when executed by a processor perform a method, the method comprising:
    receiving a plurality of first records electronically over a data communication line at a first terminal, wherein the first terminal includes a processor and memory and is local to a human user, and the first records include at least one of: an e-mail, a word processing letter document, or an audio phone recording;
    automatically storing the received first records on a records management server, remote from the first terminal, responsive to automatically identifying at the local terminal an identifier in the first records, wherein the identifier identifies a contact of a plurality of contacts in a contact application executed on the first terminal, the identifier including a sender for the e-mail, an originating telephone number for the audio phone recording, and a letter recipient for the word processing letter document, wherein the automatically identifying the identifier in the e-mail includes using smart text to automatically recognize names within text at the first terminal;

automatically storing on the remote server a second record newly created at the first terminal, responsive to automatically identifying the identifier in the second record at the first terminal;

associating the stored first and second records with a file on the server, wherein the file corresponds to the contact;

displaying, by the contact application, a representation of all records stored on the server corresponding to the contact; and providing, by the contact application, access to all records stored on the server corresponding to the contact.

19. The non-transitory computer-readable storage medium of claim 18, wherein the method further comprises:

requesting metadata related to the record from a user of the first terminal, receiving the metadata related to the record from the user;

storing the metadata on the remote server, and associating the metadata with the file on the remote server.

20. The non-transitory computer-readable storage medium of claim 18, wherein the identifier identifies a business partner's name.

21. The non-transitory computer-readable storage medium of claim 18, the method further comprising:

creating the file on the server if the file corresponding to the contact does not exist.

22. The non-transitory computer-readable storage medium of claim 18, the method further comprising:

requesting metadata related to the first records from a user of the first terminal;

receiving the metadata related to the first records from the user;

storing the metadata on the remote server; and associating the metadata with the file on the remote server.

23. The non-transitory computer-readable storage medium of claim 18, wherein the first records are received electronically from an originating computer that is different than the first terminal and the records management server.

24. The non-transitory computer-readable storage medium of claim 18, wherein the first records are received intact, and not entered manually by a user of the first terminal.

25. The non-transitory computer-readable storage medium of claim 18, wherein the first records do not already exist at the first terminal prior to being received electronically at the first terminal.

26. The non-transitory computer-readable storage medium of claim 18, wherein the identifier of the e-mail is based on at least one of: an email address of the sender of the email, or a name of the sender of the email; and wherein the automatically identifying the identifier of the e-mail includes scanning the email to identify at least one of: the email address of the sender, or the name of the sender.

27. The non-transitory computer-readable storage medium of claim 18, wherein the first records include a scanned document, and the identifier includes a machine readable identifier for the scanned document.

28. The non-transitory computer-readable storage medium of claim 18, the method further comprising:

displaying, by the contact application, a plurality of user-selectable tabs including a first tab and a second tab;

in response to selection by the user of the first tab, displaying information related to the contact; and in response to selection by the user of the second tab, displaying the representation of all records stored on the server corresponding to the contact.

29. The non-transitory computer-readable storage medium of claim 18, the method further comprising:

displaying, by the contact application, a plurality of action buttons configured to implement, in response to selection by the user, a plurality of actions on stored records corresponding to the contact, the actions including adding, deleting and moving the records.

30. The non-transitory computer-readable storage medium of claim 18, the method further comprising testing whether the identifier already exists on the records management server.

31. The non-transitory computer-readable storage medium of claim 18, wherein the testing includes checking whether the file exists on the records management server and includes the identifier.

32. The non-transitory computer-readable storage medium of claim 18, the method further comprising, in response to a determination that the identifier does not already exist on the records management server, creating the file on the records management server and associating the file with the identifier.

33. The non-transitory computer-readable storage medium of claim 18, wherein the automatically storing in response to the automatic identifying is performed by a plurality of different applications, including an email application and a word processing application.

34. The non-transitory computer-readable storage medium of claim 18, wherein the automatically storing in response to the automatic identifying is performed by plug-ins to the plurality of different applications.

35. The non-transitory computer-readable storage medium of claim 18, the method further comprising providing a menu to a user for manually storing the received records on the records management server in addition to the automatic storing in response to the automatic identifying.

\* \* \* \* \*